United States Patent
Sakamoto et al.

(10) Patent No.: US 10,253,879 B2
(45) Date of Patent: Apr. 9, 2019

(54) TRANSMISSION CONTROL SYSTEM

(71) Applicant: Hitachi Automotive Systems, Ltd., Hitachinaka-shi, Ibaraki (JP)

(72) Inventors: Hiroyuki Sakamoto, Hitachinaka (JP); Hideki Sekiguchi, Hitachinaka (JP); Fumihiro Ohsawa, Hitachinaka (JP); Yuta Tanaka, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 78 days.

(21) Appl. No.: 15/542,517

(22) PCT Filed: Jan. 29, 2016

(86) PCT No.: PCT/JP2016/052568
§ 371 (c)(1),
(2) Date: Jul. 10, 2017

(87) PCT Pub. No.: WO2016/125689
PCT Pub. Date: Aug. 11, 2016

(65) Prior Publication Data
US 2018/0266551 A1    Sep. 20, 2018

(30) Foreign Application Priority Data

Feb. 5, 2015 (JP) ................. 2015-020823

(51) Int. Cl.
*F16H 61/662* (2006.01)
*F16H 59/70* (2006.01)
(Continued)

(52) U.S. Cl.
CPC ........... *F16H 61/662* (2013.01); *F16H 59/70* (2013.01); *F16H 61/32* (2013.01); *F16H 61/425* (2013.01);
(Continued)

(58) Field of Classification Search
CPC ........ F16H 61/32; F16H 61/66; F16H 61/662; F16H 61/664; F16H 2059/6853; F16H 2059/704
See application file for complete search history.

(56) References Cited

U.S. PATENT DOCUMENTS 2,662,189 A * 12/1953 Brown ................. F02N 19/001
200/61.88
2005/0037876 A1    2/2005 Unno et al.
(Continued)

FOREIGN PATENT DOCUMENTS

JP    6-42618 A    2/1994
JP    9-250631 A   9/1997
(Continued)

OTHER PUBLICATIONS

International Search Report (PCT/ISA/210) issued in PCT Application No. PCT/JP2016/052568 dated May 24, 2016 with English translation (Two (2) pages).
Japanese-language Written Opinion (PCT/ISA/237) issued in PCT Application No. PCT/JP2016/052568 dated May 24, 2016 (Three (3) pages).
Extended European Search Report issued in counterpart European Application No. 16746520.2 dated Aug. 7, 2018 (six (6) pages).

*Primary Examiner* — Edwin A Young
(74) *Attorney, Agent, or Firm* — Crowell & Moring LLP

(57) ABSTRACT

Provided is a transmission control system that enables more precise control of the transmission ratio. This transmission control system is provided with a motor, an actuator, a transmission, a position sensor, a current sensor, and a control unit. The control unit includes: a drive unit that drives the motor while the vehicle is stopped; and a first estimation unit that estimates the initial transmission ratio, which indicates the transmission ratio when the ignition switch is turned on, on the basis of a rotation position detected by the position sensor, a load current detected by the current sensor, and a characteristic curve over a period during which the drive unit is operating.

10 Claims, 6 Drawing Sheets

(51) Int. Cl.
    *F16H 61/66*         (2006.01)
    *H02P 29/00*        (2016.01)
    *F16H 61/32*         (2006.01)
    *F16H 61/425*       (2010.01)
    *F16H 61/435*       (2010.01)
    *F16H 61/664*       (2006.01)
    *F16H 63/06*         (2006.01)
    *F16H 59/68*         (2006.01)

(52) U.S. Cl.
    CPC ........... *F16H 61/435* (2013.01); *F16H 61/66* (2013.01); *F16H 61/664* (2013.01); *H02P 29/00* (2013.01); *F16H 63/062* (2013.01); *F16H 2059/6853* (2013.01); *F16H 2059/704* (2013.01); *F16H 2342/02* (2013.01)

(56) References Cited

U.S. PATENT DOCUMENTS

2013/0327423 A1* 12/2013 Kanzaki ................ F16H 61/061
                                            137/487.5
2014/0139172 A1   5/2014 Yamada
2016/0214599 A1*  7/2016 Doering ................ B60W 30/19

FOREIGN PATENT DOCUMENTS

JP       2001-99303 A     4/2001
JP       2008-106813 A    5/2008

* cited by examiner

TRANSMISSION CONTROL SYSTEM

TECHNICAL FIELD

The present invention relates to a transmission control system.

BACKGROUND ART

Conventionally, a hydraulic actuator is used in many of transmissions. However, the hydraulic actuator is not good at responsiveness, and the characteristics are changed depending on an environmental factor such as a temperature. In addition, since a hydraulic pressure generator is necessarily mounted, the hydraulic pressure generator may become a deterioration factor such as costs, weight, and volume.

On the other hand, even though an electric mechanism component such as an electric motor has a merit on a less change in characteristics such as the responsiveness and the environmental factor, there is a problem in that a power capacity and a mechanical output are small. Therefore, even though there is an idea of technically electrifying an actuator for a transmission for quite a while, the idea has not been realized due to the above problem, and thus the most part is occupied by the hydraulic drive.

However, the above problem has been solved as a recent electrifying technology is improved. Therefore, a product made for electrifying an electric oil pump even in the transmission is commercially available.

Regarding the electrifying of the transmission, there is known a technology in which a stepping motor adjusts a hydraulic pressure of a hydraulic oil to be supplied to a primary pulley of a belt-type continuously variable transmission (for example, see PTL 1).

CITATION LIST

Patent Literature

PTL 1: JP 2008-106813 A

SUMMARY OF INVENTION

Technical Problem

In a case where a position control of the transmission is performed by the electric motor as disclosed in the technology of PTL 1, an absolute position sensor may be provided in the transmission. However, the inventor of the application has studied about using the position sensor for controlling the motor in order to reduce the cost.

The position sensor for controlling the motor is mainly used to measure an electric angle of the motor, and thus in many cases the position sensor is not able to cover an allowed angle range as a mechanical angle including the actuator. Therefore, the angle is accumulated in a controller to calculate a mechanical angle. When the power of the controller is turned off, the calculated and stored mechanical angle is erased, and thus a correspondence between the electric angle and the mechanical angle disappears. Therefore, in many cases, the values are stored in a storage device which can hold its memory even when the power is turned off.

However, as described above, even when the values are stored in the storage device, the correspondence with respect to a transmission ratio is deviated when a rotational position of the motor is changed while the power is turned off. Therefore, the controllability of the transmission ratio is degraded.

In addition, even in a normal energizing state, the transmission ratio with respect to the rotation of the motor may be subtly deviated due to a relation between bending, torsion, and an initial position of the member. Further, since there is a back lash between the actuator and a rotation shaft, there occurs a difference with respect to the transmission ratio when a moving direction is reversed. Furthermore, the transmission ratio may be deviated by a residual stress caused by an inner structure of the transmission even when the actuator and the motor are not changed. As a result, there occurs a deviance between the motor and the transmission ratio.

In a case where the control of the transmission ratio is applied to the motor, the torque may be amplified using gears in many cases. This is because the conditions of torque and speed may be not satisfied even through the output of the motor satisfies a certain condition. In many cases, there is a deceleration ratio. Therefore, there is a need to mount a lot of gears in the electric motor, and the characteristic is necessarily changed by the back lash and the torsion.

In this way, there is a large error between the rotational position and the transmission ratio in a case where only the position sensor of the motor is used. Therefore, there is a need to provide a measurement device which directly obtains the transmission ratio. As a representative example of the measurement device, rotation sensors are attached to an input shaft and an output shaft. A ratio of the rotational speed of both rotation sensors becomes the transmission ratio, so that it is possible to secure the accuracy of the transmission ratio. However, in the rotation sensor, the rotational speed is not generated in the output shaft while the vehicle is stopped. Therefore, it is not possible to measure the transmission ratio.

In particular, when the vehicle is stopped, an operator may turn off an IGN (ignition switch) after rapid deceleration to get off the vehicle, or the transmission ratio may do not reach a low speed sufficient to restarting depending on the transmission. Therefore, there is a need to provide a sensor to measure the transmission ratio on the transmission when the vehicle is stopped. However, there is a problem in the costs and the attachment layout.

The rotation sensor is used as a sensor which can easily grasp a behavior of the vehicle in addition to the transmission ratio. Therefore, in a case where the position sensor of the motor is used, the initial position when the power is turned off is regarded as important.

An object of the invention is to provide a transmission control system which is able to improve a control accuracy of a transmission ratio.

Solution to Problem

In order to achieve the object, the present invention is a transmission control system, including: a motor; an actuator that is driven by torque of the motor; a transmission that changes a transmission ratio according to a changed position of the actuator; a current sensor that detects a load current indicating a current to be supplied to the motor; a position sensor that detects a rotational position of the motor; a storage device that stores the transmission ratio in association with a plurality of characteristic curves indicating a correspondence relation between the rotational position and the load current; a drive unit that drives the motor while a vehicle is stopped; and a control device that includes a first estimation unit to estimate an initial transmission ratio indicating the transmission ratio when an ignition switch is turned on from the rotational position detected by the position sensor, the load current detected by the current sensor, and the characteristic curve in a period when the drive unit operates.

Advantageous Effects of Invention

According to the invention, it is possible to improve a control accuracy of a transmission ratio. Objects, configurations, and features other than those described above will become clear through the explanation about the following embodiments.

DESCRIPTION OF EMBODIMENTS

Hereinafter, configurations and the operational effects of a transmission control system according to an embodiment of the invention will be described using the drawings. Further, the same symbol in the respective drawings indicates the same portion.

Figure 1:
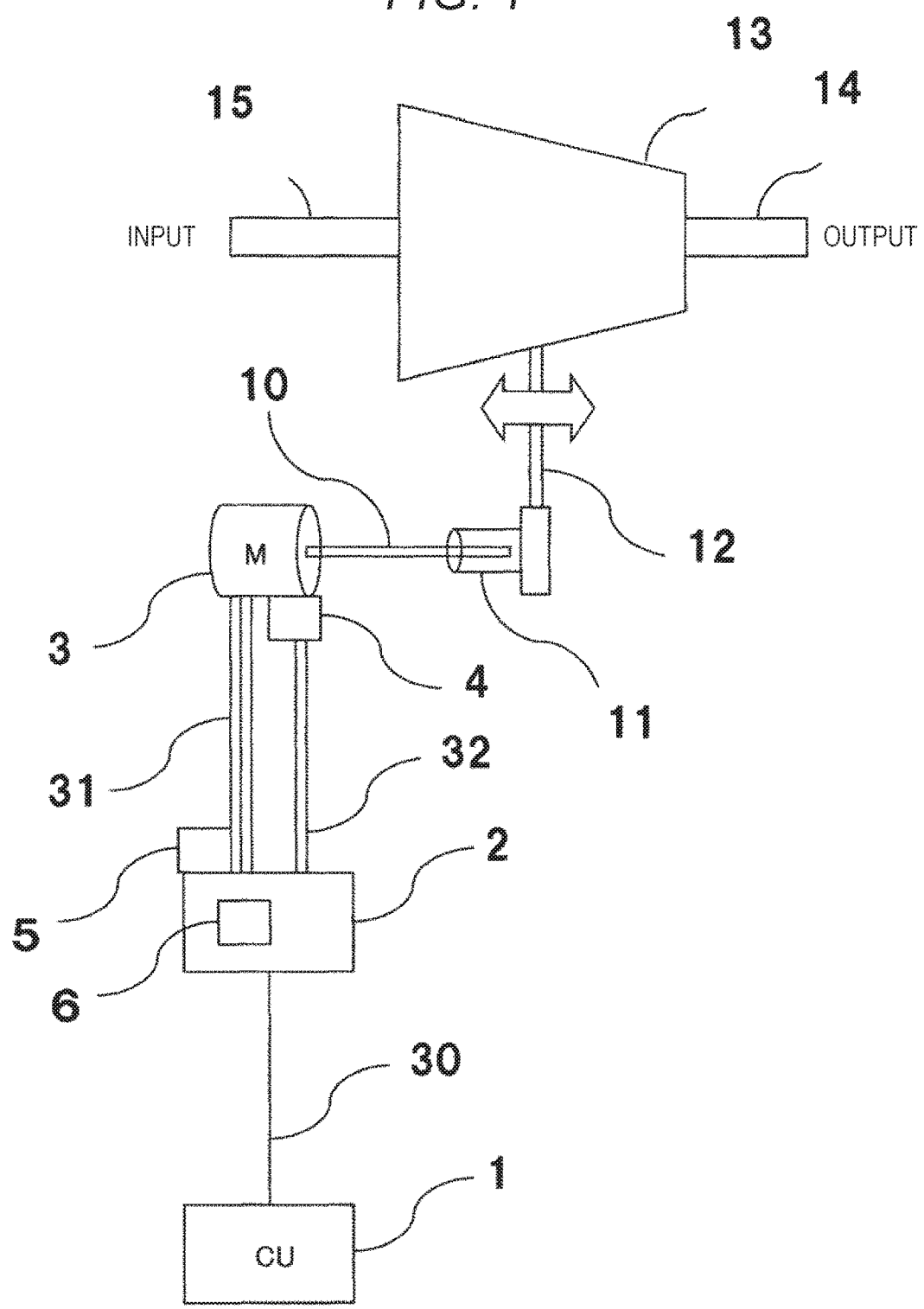
FIG. 1 is a diagram illustrating a configuration of a transmission control system according to an embodiment of the invention.
Figure 2:
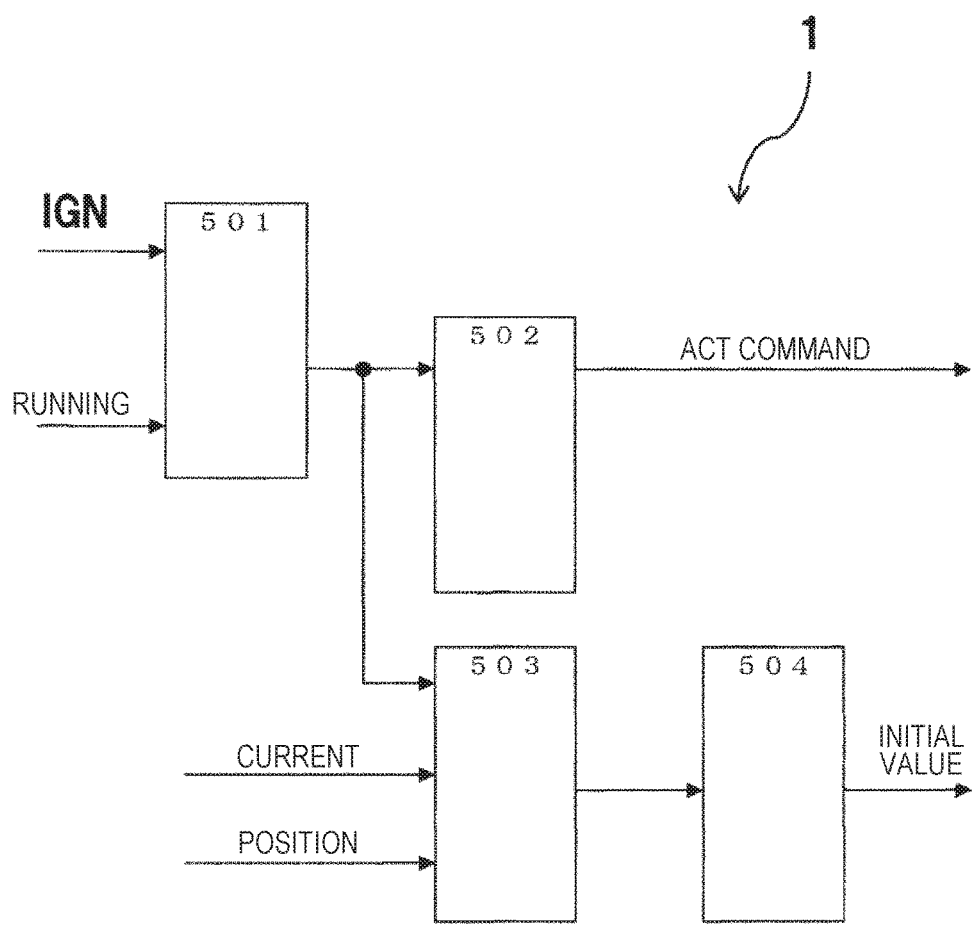
FIG. 2 is a block diagram (schematic view) of a control unit (CU) illustrated in FIG. 1.

FIG. 1 is a diagram illustrating a configuration of the transmission control system according to an embodiment of the invention. FIG. 2 is a block diagram (schematic view) of a control unit 1 (CU) illustrated in FIG. 1.

The control unit 1 is connected to a driver 2 which controls a motor 3 through a communication line 30, and transmits a position command of the motor 3 and receives a measurement position. Further, the control unit 1 (control device) is configured to include a microcomputer (arithmetic device), a memory (storage device), a communication device, and an IC (Integrated Circuit).

The driver 2 controls a rotation torque of the motor 3 through a drive line 31, and inputs rotational position information from a position sensor 4 (rotation sensor) which detects a rotational position of the motor 3 through a signal line 32, and thus controls the rotational position of the motor to be a predetermined position. Herein, the drive line 31 is provided with a current sensor 5 which detects a load current indicating a current to be supplied to the motor 3.

The motor 3 is connected to rotate a rotation shaft 10 so as to make the position of an actuator 11 vary. In other words, the actuator 11 is driven by a torque of the motor 3. Herein, the actuator 11 may be a mechanism which can move in an axial direction with respect to the rotation axis by a ball screw mechanism for example. The actuator 11 applies a load corresponding to the rotational position of the motor 3 toward the motor 3.

The actuator 11 is connected to a slide shaft 12, and can change a transmission ratio of a transmission 13 by moving the shaft. In other words, the transmission 13 changes the transmission ratio according to a changed position of the actuator 11. When the transmission 13 changes the transmission ratio, a rotation speed ratio of an input shaft 15 and an output shaft 14 is changed, so that the speed of the vehicle can be changed while the vehicle is running.

Herein, the transmission 13 to realize the change of the transmission ratio can be realized using a belt-type continuously variable transmission for example. According to a conventional vehicle, the input shaft 15 is, for example, connected to an internal combustion engine, and the output shaft 14 is, for example, connected to a wheel through a differential mechanism. These components are omitted in FIG. 1 in order to make the point of the invention clear.

For example, in a case where the position of the actuator 11 and the transmission ratio are proportional to each other, the transmission ratio can be arbitrarily set by rotating the motor 3 to change the position of the actuator 11. Therefore, the transmission can be performed in the vehicle while the vehicle is running.

In a case where the rotational position of the motor 3 and the position of the actuator 11 are also proportional to each other, the transmission ratio can be controlled by controlling the rotational position of the motor 3. However, the transmission ratio may be subtly deviated with respect to the rotation of the motor 3 in a relation between bending, torsion, and an initial position of the member. For example, the rotation shaft 10 is applied with the rotational force of the motor 3, and thus an angle error is generated by a torsional characteristic of the member. In addition, a positional error occurs in the slide shaft 12 by the bending. Further, there occurs aback lash between the actuator 11 and the rotation shaft 10. Therefore, a difference occurs in the transmission ratio when a moving direction is reversed. Further, in a case where a deviation occurs in the transmission ratio by a stress caused from the internal structure of the transmission 13 even though the actuator 11 and the motor 3 are not changed, there is a deviance between the transmission ratio and the motor 3.

In this way, there occurs a large error between the rotational position and the transmission ratio in a case where only the position sensor 4 of the motor 3 is used. Therefore, there is a need to use a measurement device which directly obtains the transmission ratio. As a representative example of the measurement device, rotation sensors are attached to an input shaft and an output shaft. A ratio of rotational speeds of both rotation sensors becomes the transmission ratio, so that it is possible to secure the accuracy of the transmission ratio. However, in the rotation sensor, the rotational speed is not generated in the output shaft 14 while the vehicle is stopped, and thus the transmission ratio is not possible to be measured.

In a case where the position of the motor 3 is deviated by the mechanical error during a period from the power OFF while the vehicle is stopped to the power ON before the next running, position information stored in the driver 2 which drives the motor 3 is deviated from an actual position. Therefore, it is difficult to control the transmission ratio with accuracy.

In many cases, the position information of the position sensor 4 is used to perform a rotation control of the motor, and is measured in an electrical angular range which is determined by an armature and a magnetic. In this case, when a mechanical rotation range of the motor 3 exceeds an angular range of the position sensor 4, the transmission ratio is increased by a 2-digit number or more with respect to the position indicated by the position sensor 4. Therefore, the control position may not be determined.

An embodiment of the invention provides the following functions to solve such a problem.

The position of the motor 3 is changed in a magnitude direction of the transmission ratio in a mechanical control path of the transmission ratio from the motor 3 to the actuator 11, and measures the position of the motor 3 and a load current (ACT current). The initial position of the motor 3 is calculated from a positional relation between the transmission position and the motor 3 according to a characteristic diagram of the position and the load current, so that the initial position can be corrected after the power ON even the actuator 11 and the mechanism are changed during the power OFF.

As a characteristic of the transmission, there is a change in a deceleration ratio of the output shaft and the input shaft. In a case where the deceleration ratio is set to be changed even while the rotation body is stopped, a load of the rotation body corresponding to the deceleration ratio is generated. In a case where only the actuator 11 is changed, the load change becomes a load change only to the actuator 11, and thus the actuator 11 is changed, so that it is possible to grasp the change of the deceleration ratio. Since the change is different according to a mechanism, it can be realized by associating the relation of the actuator 11 and the transmission ratio on the basis of the characteristic according to the mechanism.

According to the mechanism of the transmission, there is also a case where the transmission position can be estimated from the load current and the position of the motor 3 without operating the actuator 11. For example, the load of the actuator 11 is related to a press force of torque in a belt-type CVT (Continuously Variable Transmission) described below. Therefore, in a case where the position is not changed, it is difficult to obtain a correlation among the load current, the position, and the transmission ratio.

FIG. 2 illustrates a block diagram of this embodiment. First, there is a condition determining device 501 which grasps the initial position. Conditions of the stopping and an IGN ON of the vehicle are determined by the condition determining device. The actuator 11 is not possible to operate while the vehicle is running in order to operate for the purpose other than the transmission. In addition, the above-described condition determination is performed in order to cope with the change while the IGN is turned OFF.

Herein, a position moving device 502 (drive unit) may operate within a predetermined period after the ignition switch is turned ON, or may operate at timing when the ignition switch is turned ON.

Next, during a period when the condition is satisfied in the condition determining device 501, the position moving device 502 operates the actuator 11, and first changes the actuator 11 toward a low vehicle speed (Lo) of the actuator 11. Herein, the actuator 11 may be changed toward a high vehicle speed (Hi) at the beginning for the purpose of changing the actuator 11.

The change speed is set to be low or the actuator is slowly moved to the limit on a low speed side while being repeatedly stopped at arbitrary points. This is in order to suppress a dynamic load such as an inertia moment. Further, at this time, the input shaft 15 and the output shaft 14 of the transmission 13 are stopped. The position moving device 502 serves as a drive unit which drives the motor 3 while the vehicle is stopped.

The change speed is desirably set not to affect a load state of the mechanism since a load for changing the position of the motor itself is added to the load of the mechanism for stopping the motor. However, in consideration of the characteristic, in a case where the load current at the time of changing can be calculated from the inertia moment of the motor itself, it is better to make a change as fast as possible because a time for completing the positional correction can be shortened.

After moving to the limit on the low speed side, the actuator 11 is conversely moved to a high speed (Hi) side. In a case where the actuator is moved to the high speed side for the first time, it is conversely moved to the low speed side. Meanwhile, a signal of the current sensor 5 and a signal of the position sensor 4 of the motor 3 are stored in a storage device 6 using an observation device 503.

Figure 3:
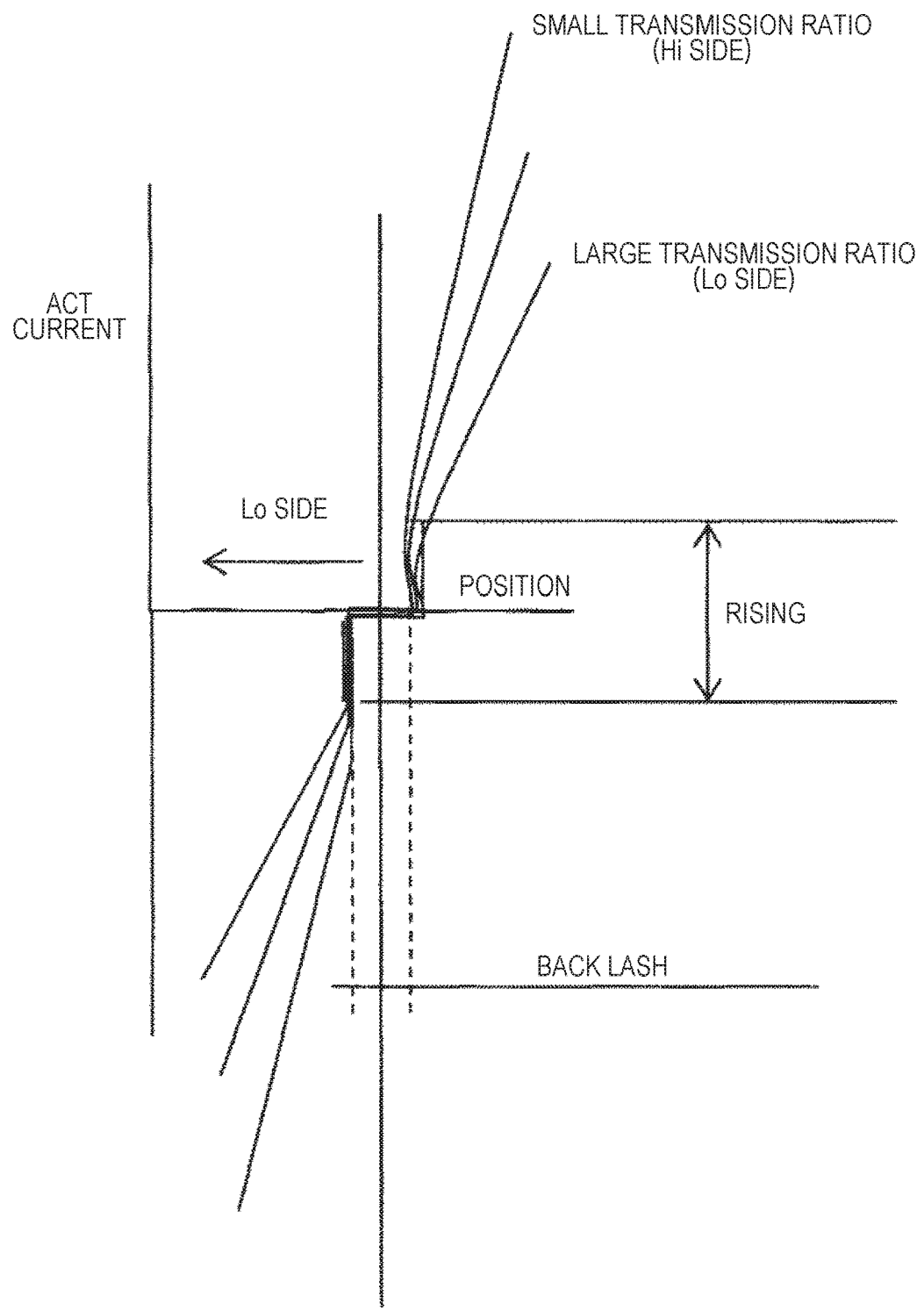
FIG. 3 is a diagram for describing a characteristic curve used in the transmission control system according to an embodiment of the invention.

FIG. 3 is a diagram for describing a characteristic curve used in the transmission control system according to an embodiment of the invention. Herein, the characteristic curve is a curve indicating a correspondence relation between the rotational position of the motor 3 detected by the position sensor 4 and the load current (ACT current) detected by the current sensor 5. The characteristic curve is stored in the storage device equipped in the control unit 1 in association with the transmission ratio, or may be stored in an external storage device of the control unit 1.

Data stored by the observation device 503 becomes a waveform containing the back lash as illustrated in FIG. 3. In some cases, there may be no negative side depending on a transmission. Further, the current value of the current sensor 5 may be an inflection point at any position other than "0". Since such a specification is set according to a transmission, the characteristics of the transmission should be grasped and compared in advance. The stored data is necessarily stored in a range only while the actuator 11 is moving. Therefore, a storing timing is set according to information during establishing the condition of the condition determining device 501 which is input by the position moving device 502.

It is possible to calculate the transmission ratio while the vehicle is stopped by determining that the nearest line is a transmission position according to the characteristic of the transmission of which the stored data is grasped by an analysis device 504 in advance.

Herein, the analysis device 504 serves as a first estimation unit which estimates an initial transmission ratio indicating a transmission ratio when the ignition switch is turned on from the rotational position detected by the position sensor 4, the load current detected by the current sensor 5, and the characteristic curve in a period when the position moving device 502 (drive unit) is operating.

Specifically, for example, the analysis device 504 (first estimation unit) estimates the transmission ratio corresponding to the characteristic curve as the initial transmission ratio in a case where the rotational position detected by the position sensor 4 and the load current detected by the current sensor 5 follow (fit to) the characteristic curve or an offset (translated) characteristic curve during a period when the position moving device 502 (drive unit) is operating.

In a case where the transmission ratio can be determined while the vehicle is stopped, and the transmission ratio corresponds to the actuator 11 in a one-to-one manner, the position of the actuator 11 can be easily estimated, and the initial position of the motor 3 can also be set from the relation to the actuator 11.

Herein, on the basis of the rotational position in a range where the load current is not changed, the analysis device 504 (second estimation unit) may estimate an initial rotational position indicating the rotational position of the motor 3 when the ignition switch is turned on in a case where the load current detected by the current sensor 5 is not changed even when the rotational position detected by the position sensor 4 is changed during a period when the position moving device 502 (drive unit) is operating.

Specifically, for example, the analysis device 504 (second estimation unit) sets an average of the rotational position in a range where the load current is not changed as the initial rotational position. However, the initial rotational position is not limited to the average value of the rotational position, and may be set to any value between a minimum value and a maximum value of the rotational position in a range where the load current is not changed.

In addition, as the initial rotational position, the analysis device 504 (second estimation unit) may estimate a rotational position at an inflection point of the curve drawn by a locus of the rotational position detected by the position sensor 4 and the load current detected by the current sensor 5 in a period when the position moving device 502 (drive unit) is operating.

In this way, the transmission position while the vehicle is stopped can be grasped by calculating the transmission position and the initial position of the motor before the transmission ratio from the rotation sensor is determined, and an acceleration performance can be improved.

In a case where the initial position of the motor 3 is determined, the comparison with the initial position stored in advance is easy. The control of the transmission ratio while the vehicle is normally running can also be improved by calculating the transmission position using a new initial position. In addition, it is also possible to improve controllability by feeding back a difference between the new initial position and the stored initial position to the transmission line at any time (for example, applying an offset to the transmission line).

(Toroidal Continuously Variable Transmission)

Figure 4:
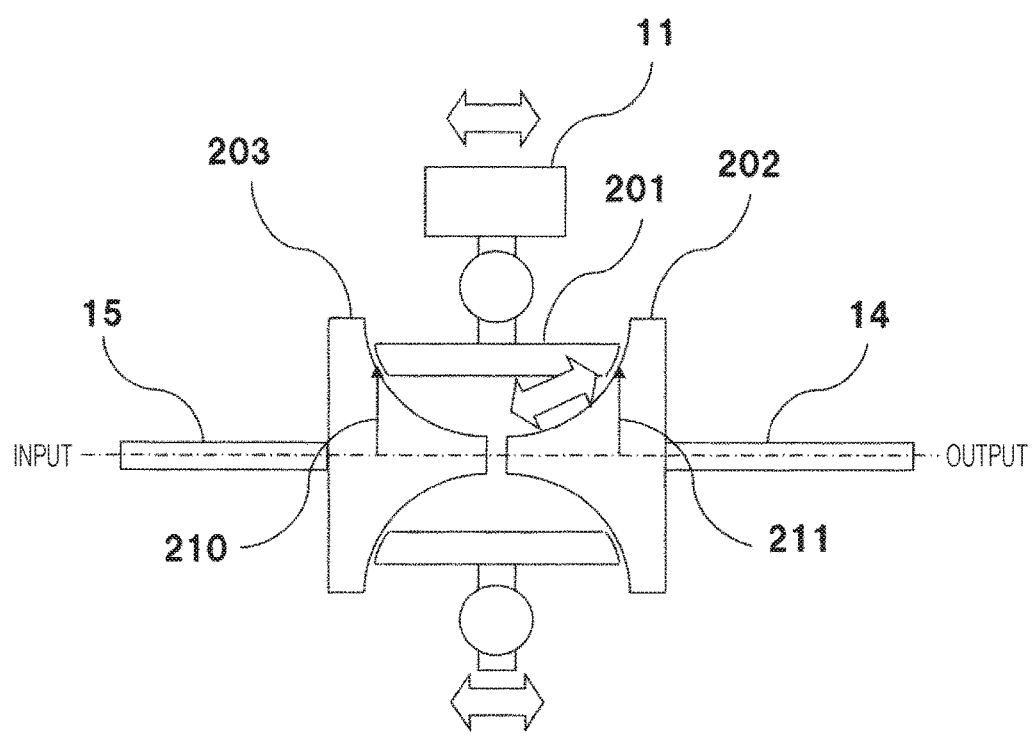
FIG. 4 is a diagram illustrating an example in which the invention is applied to a toroidal continuously variable transmission.

FIG. 4 is a diagram illustrating an example in which the invention is applied to a toroidal CVT (Continuously Variable Transmission). The rotation of an input disk 203 connected to the input shaft 15 transfers rotational energy to a roller 201 through a traction oil, and the rotational energy is also transferred from the roller 201 to an output disk 202 through the traction oil.

A distance from the axial center of the input disk 203 to a contact point between the input disk 203 and the roller 201 is an input radius 210, and a distance from the axial center of the output disk 202 to a contact point between the output disk 202 and the roller 201 is an output radius 211, and thus the transmission ratio=the output radius 211/the input radius 210 is satisfied.

The input shaft 15 is connected to the internal combustion engine for example, and the output shaft 14 is connected to a wheel through the differential mechanism for example.

Herein, the transmission ratio can vary by changing the position of the actuator 11, so that the input radius 210 and the output radius 211 can vary. A relation between the position of the actuator 11 and the transmission ratio is schematically as follows.

Large transmission ratio (low speed side): Incline the actuator 11 to the left side. Small transmission ratio (high speed side): Incline the actuator 11 to the right side.

In a case where the pressing pressures to the axial directions of the input disk 203 and the output disk 202 are the same, a holding force of the actuator 11 is minimized when the slope of the roller 201 is horizontal, and the holding force of the actuator 11 is necessarily increased as the slope is increased.

In a case where there is no holding torque of the input disk 203 and the output disk 202, a stress is applied to the roller 201 to be horizontal, but the change is hindered by a contact resistance between the input disk 203 and the output disk 202 and thus a stop position becomes unclear.

Therefore, the initial position becomes unclear at the time when the power is turned off to on in the position sensor 4 for controlling the motor 3.

According to this embodiment, in a case where the pressing pressures of the input disk 203 and the output disk 202 are the same, it is possible to estimate the initial position of the actuator 11 according to the characteristic of the mechanism.

When the actuator 11 is slowly changed from side to side, the holding force of the actuator 11 is changed, and a point at which the holding force is minimized is disposed on the horizontal point of the roller 201. With the point as the initial position, it is possible to make an adjustment from the characteristic line of the transmission with respect to a moving distance of the actuator 11 to a maximum transmission ratio (lowest speed side).

The characteristic line of the transmission indicates a relation between the rotational position of the motor 3 calculated from an inclination angle of the roller 201 and the transmission ratio, and the transmission ratio is a value calculated from the input radius 210 and the output radius 211 which are the distances from the positions at the contact points of the input disk 203 and the output disk 202 to the respective axial centers of the disks. The value is a designed value of the mechanism, and makes the characteristic calculation easy.

In a case where the actuator 11 is changed, a load is caused. Therefore, the torsion, the bending, and the back lash of the shaft necessarily occur from the motor 3 to the transmission. In the case of the torsion and the bending, the accuracy in calculation of the initial value can be improved by grasping a relation between a characteristic value of a material and the load.

For example, in the case of the actuator mechanism illustrated in FIG. 1, the torsional characteristic of the rotation shaft 10 connected to the motor 3 can make the relation between the rotational load and the torsion clear from the material characteristic of the rotation shaft 10. In addition, similarly to the slide shaft 12, a relation between the load and a bending amount can be grasped from the material characteristic of the slide shaft 12. In the back lash, the load current is grasped by reversing the motor 3, so that the amount of the back lash can be grasped. Regarding such an error, the accuracy can be improved by correcting the data acquired when the motor 3 is changed.

In other words, the analysis device 504 (second estimation unit) may correct the initial rotational position according to the configuration of the actuator 11 or the material of the component of the actuator 11. In addition, the position moving device 502 (drive unit) may drive the motor on the basis of the initial rotational position estimated by the analysis device 504 (second estimation unit).

(Hydromechanical Transmission)

Figure 5:
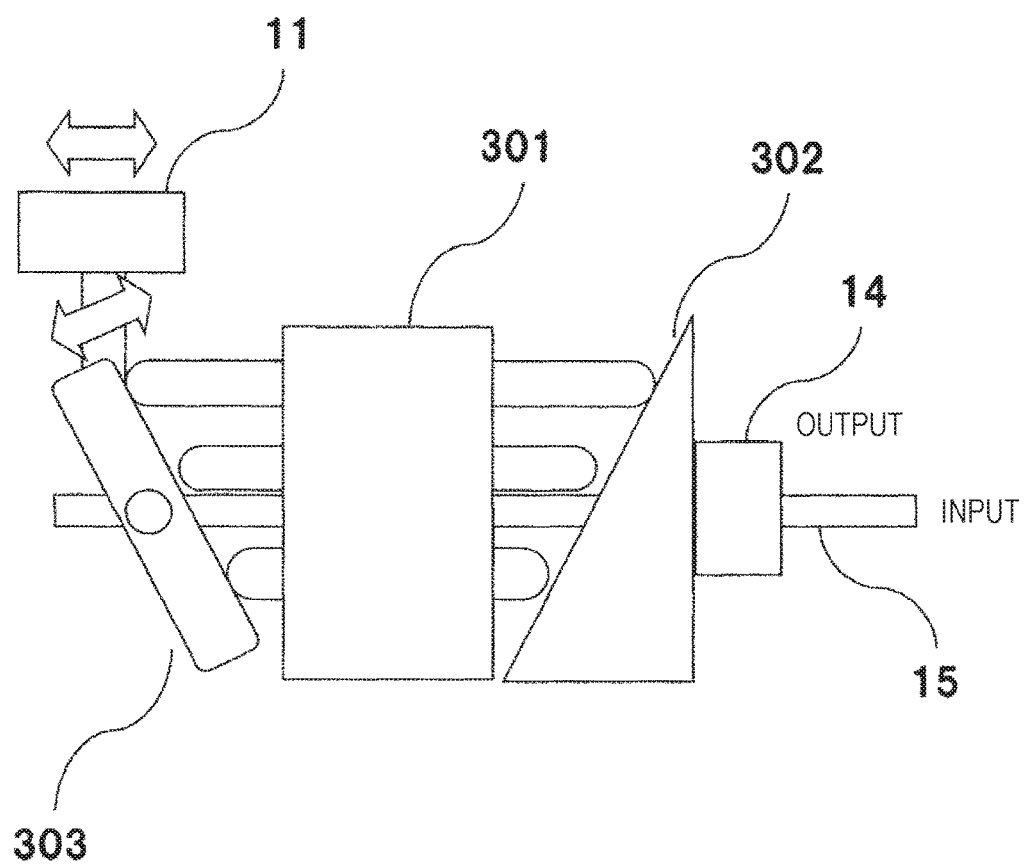
FIG. 5 is a diagram illustrating an example in which the invention is applied to a hydromechanical transmission.

FIG. 5 is a diagram illustrating an example in which the invention is applied to an HMT (Hydraulic Mechanical Transmission). A hydraulic pressure is generated by pressing a piston in a plunger block 301 connected to the input shaft 15 by a hydraulic pump 303 while the input shaft 15 rotates. A hydraulic motor 302 rotates the output shaft 14 by the hydraulic pressure.

Since a variation amount of the piston is changed by the slope of an inclined plate of the hydraulic pump 303, the transmission ratio can vary. Herein, in FIG. 5, the actuator 11 is connected to the hydraulic pump 303 to make the inclined plate of the hydraulic pump 303 vary. The same effect can be obtained even by connecting the actuator 11 to the hydraulic motor 302, so that an inclined plate of the hydraulic motor 302 can vary. Herein, the description herein will be given about a case where the actuator is connected to the hydraulic pump 303.

The input shaft 15 is connected to the internal combustion engine for example, and the output shaft 14 is connected to a wheel through the differential mechanism for example.

Herein, the transmission ratio can be changed by changing the position of the actuator 11, so that the inclined plate of the hydraulic pump 303 can vary. A relation between the position of the actuator 11 and the transmission ratio is schematically as follows.

Large transmission ratio (low speed side): Incline the actuator 11 to the right side. Small transmission ratio (high speed side): Incline the actuator 11 to the left side.

When the vehicle is stopped, the power is turned off, and the holding force of the actuator 11 disappears. Therefore, the actuator 11 is inclined to the left by a residual hydraulic pressure in the hydraulic pump 303. Then, the transmission position after the power is turned off becomes unclear.

Therefore, the initial position at the time when the power is turned off to on becomes unclear in the position sensor 4 for controlling the motor 3.

According to this embodiment, in a case where a constant hydraulic pressure is supplied to the hydraulic pump 303 and the hydraulic motor 302, it is possible to estimate the initial position of the actuator 11 according to the characteristic of the mechanism.

When the actuator 11 is slowly changed from side to side, the holding force of the actuator 11 is changed according to a set hydraulic pressure and an inclined angle of the hydraulic pump 303. A point at which the holding force is minimized becomes a point at which the pressing pressure is not applied to the piston of the hydraulic pump 302. With the point as the initial position, it is possible to make an adjustment from the characteristic line with respect to the moving distance of the actuator 11 to a maximum transmission ratio (lowest speed side).

In this case, a characteristic is necessary for the constant hydraulic pressure and the pressing pressure of the actuator 11. The characteristic line indicates a correspondence relation between the set hydraulic pressure and an inclined angle of the inclined plate, and even the designed value can be experimentally acquired.

Similarly to the case of toroidal, in a case where the actuator 11 is changed even in this mechanism, a load is generated, and thus the torsion, the bending, and the back lash of the shaft are necessarily generated from the motor 3 to the transmission. In the case of such an error, the accuracy in calculation of the initial value can be improved by grasping a relation between the characteristic value of the material and the load.

In the back lash, the load current is grasped by reversing the motor 3, so that the amount of the back lash can be grasped. Regarding such an error, the accuracy can be improved by correcting the data acquired when the motor 3 is changed.

(Belt-Type Continuously Variable Transmission)

Figure 6:
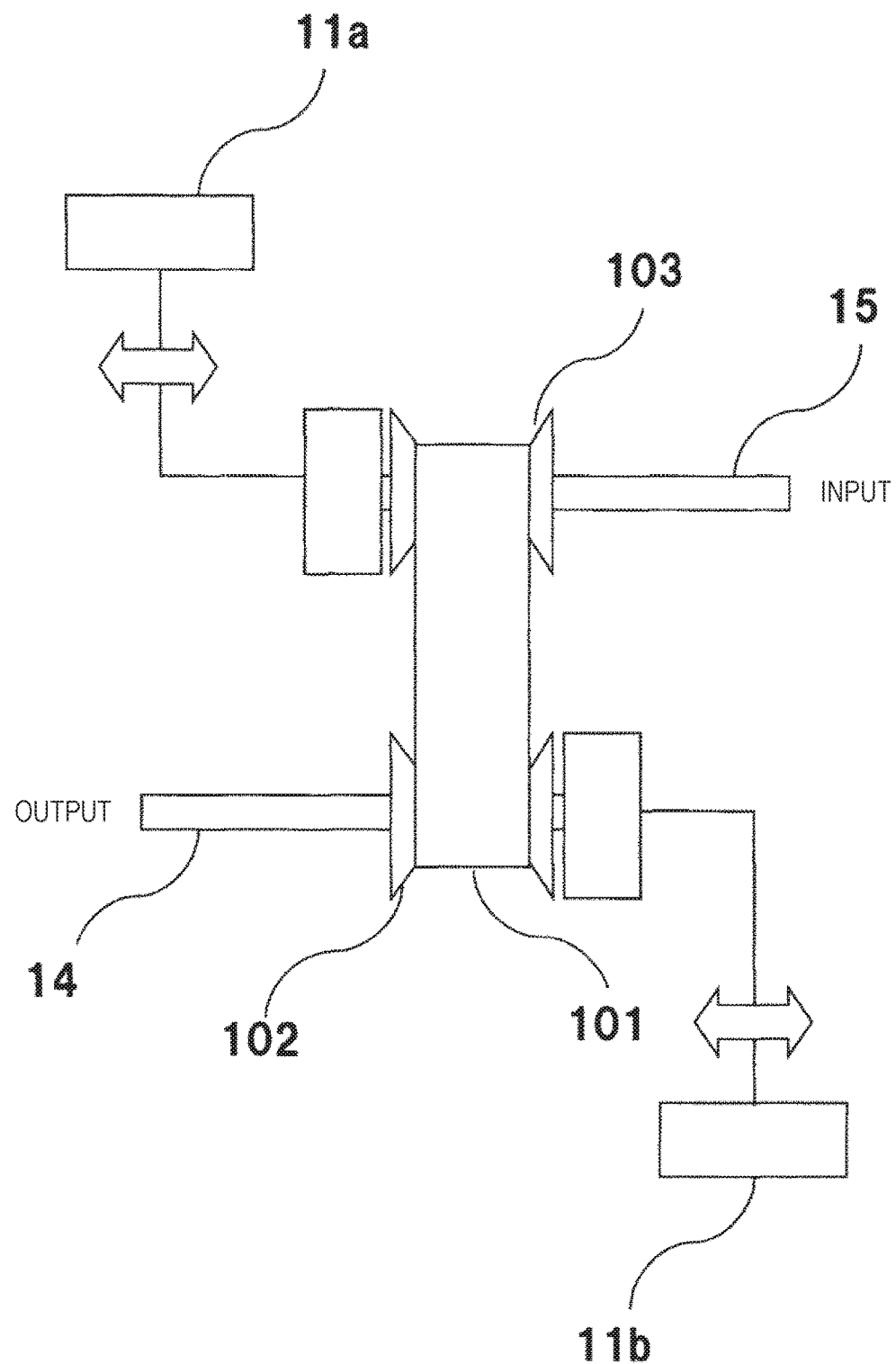
FIG. 6 is a diagram illustrating an example in which the invention is applied to a belt-type continuously variable transmission.

FIG. 6 is a diagram illustrating an example in which the invention is applied to a belt-type CVT (Continuously Variable Transmission). The rotational energy of an input pulley 103 connected to the input shaft 15 is transferred from an output pulley 102 to the output shaft 14 through a belt 101. A distance from the axial center of the input shaft 15 to a contact point between the input pulley 103 and the belt 101 is the input radius, and a distance from the axial center of the output shaft 14 to a contact point between the output pulley 102 and the belt 101 is the output radium, and thus the transmission ratio=the output radius/the input radius is satisfied.

The input shaft 15 is connected to the internal combustion engine for example, and the output shaft 14 is connected to a wheel through the differential mechanism for example.

Herein, the input radius and the output radius are changed by changing the positions of an actuator 11a and an actuator 11b, so that the transmission ratio can vary. A relation between the positions of the actuators 11a and 11b and the transmission ratio is schematically as follows.

Large transmission ratio (low speed side): the actuator 11a moves to the left side, and 11b moves to the left side. Small transmission ratio (high speed side): the actuator 11a moves to the right side, and 11b moves to the right side.

In a case where there is no holding torque in the input pulley 103 and the output pulley 102, both pulleys may be subtly changed to be opened by a tensile force of the belt.

Therefore, the initial position when the power is turned off to on may be unclear in the position sensor 4 for controlling the motor 3.

Since the input pulley 103 presses the actuator 11a, a contact point between the input pulley and the belt is widened. At this time, a load is applied on the actuator 11a. On the contrary, in a case where the input pulley moves to separate the actuator 11a, the load is also reduced by the tensile force of the belt, and thus the load of the actuator 11a becomes "0" (zero) at a tensile force=0. Even when the input pulley moves further more to separate the actuator 11a, the load of the actuator 11a is kept to "0".

With this characteristic, a contact position of the belt 101 and the input pulley 103 can be grasped. In this case, the actuator 11b is necessarily controlled to be held at the position.

Similarly, even in the case of the actuator 11b, when a force to hold the position of the actuator 11a varies, a contact position of the output pulley 102 and the belt 101 can be grasped.

When the actuator 11a and the actuator 11b are adjusted to the contact position and then the actuator 11a is pressed, a stress occurs in the actuator 11b. A press force of the actuator 11a is a force with which the input pulley 103 widens a radius of the belt 101.

When the input pulley 103 widens the radius of the belt 101, a force to make the radius of the belt 101 narrow is applied by the output pulley 102. As a result, a load occurs in the actuator 11b. The load of the actuator 11b occurs large in a case where the transmission ratio is large (low speed side).

With this principle, the press force of the actuator 11a becomes a force of widening the belt 101 in a radial direction. Assuming that the force is evenly distributed at the contact point where the belt 101 is suspended, a tensile stress of the belt 101 is determined according to a distance from the input shaft to the contact point of the belt 101, and a distance from the output shaft to the contact point of the belt 101 according to the load from the output pulley 102 to the actuator 11b is determined according to a distance from the output shaft to the contact point of the belt 101.

Therefore, the relation between the position and the load is determined by a suspending condition of the belt 101, that is, the transmission ratio. With this characteristic, the initial positions of the actuators 11a and 11b can be calculated according to the calculated current transmission ratio and the position at which an actuator load is "0".

As another method of grasping the transmission ratio, there is a method of controlling a constant drive force of the actuator 11b in a case where the position of the actuator 11a is changed. In this method, when the drive force of the actuator 11b is controlled to be constant, the position of the actuator 11b is changed as the position of the actuator 11a is changed.

Since a value obtained by multiplying the amount of change of the actuator 11a by the transmission ratio becomes the amount of change of the actuator 11b, the transmission ratio can be obtained by measuring the amounts of change of the actuators 11a and 11b. Therefore, the initial positions of the actuators 11a and 11b can be calculated from the current transmission ratio of the transmission.

In short, in a case where a position at which the loads of the actuator 11a and the actuator 11b rise from "0" is grasped, the contact position with respect to the belt 101 is determined. The transmission position can be grasped from the suspending condition of the belt 101 by obtaining the load of the actuator 11b by applying the load on the actuator 11a. The initial position of the actuator 11 can be calculated using a value calculated from the designed value of the mechanism on the basis of a relation between the transmission position and an absolute position of the actuator 11.

In a case where the actuator 11a and the actuator 11b are changed, the loads occur. Therefore, the torsion, the bending, and the back lash of the shaft necessarily occur from the motor to the transmission. In the case of the torsion and the bending, the accuracy in calculation of the initial value can be improved by grasping a relation between a characteristic value of a material and the load.

For example, in the case of the actuator mechanism illustrated in FIG. 1, the torsional characteristic of the rotation shaft 10 connected to the motor 3 can make the relation between the rotational load and the torsion clear from the material characteristic of the rotation shaft 10. In addition, similarly to the slide shaft 12, a relation between the load and a bending amount can be grasped from the material characteristic of the slide shaft 12. In the back lash, the load current is grasped by reversing the motor 3, so that the amount of the back lash can be grasped.

Regarding such an error, the accuracy can be improved by correcting the data acquired when the motor 3 is changed. In the case of this example of the CVT, two actuators are mounted. Therefore, two sets of motors and drivers are required, and the above characteristic can be grasped with respect to the respective actuators, motors, and drivers, so that the accuracy can be improved through the correction.

From an example of FIGS. 4, 5, and 6, the transmission load is taken into a motor current by changing the position of the actuator 11 by the motor 3, and the information of the position sensor of the motor 3 is compared with the characteristic of the transmission, so that a correlation between the transmission ratio and the motor 3 can be grasped.

The initial position of the motor 3 is used in position control of the actuator of the transmission control. An actual transmission ratio while the vehicle is running is generally obtained by a rotation ratio of two rotation sensors which are attached to the input shaft 15 and the output shaft 14. In the transmission control, the feedforward control is also performed in order to improve feedback control and responsiveness to reduce a difference between the transmission ratio calculated from the rotation sensor and a target transmission ratio. In particular, a feedforward control value affects trackability and responsiveness when the accuracy of the initial position is degraded. In this embodiment, the responsiveness and the trackability can be improved by utilizing the transmission control for calculating the initial position.

As described above, according to this embodiment, it is possible to improve the control accuracy of the transmission ratio. In addition, it is possible to reduce a manufacturing cost by using the position sensor for the motor control as the position control of the transmission.

Further, the invention is not limited to the above embodiments, and various modifications can be made. For example, the embodiments are described in a clearly understandable way for the invention, and thus the invention is not necessarily to provide all the configurations described above. Furthermore, additions, omissions, and substitutions may be made on some configurations of each embodiment using other configurations. In addition, other configurations may be added, removed, and replaced with respect to some of configurations of the respective embodiments.

In the embodiment, the actuator 11 has been moved to the limit (end) on the low speed side or the high speed side, but may be not moved to the limit.

In the embodiment, as an example, the internal combustion engine has been described as being connected to the input shaft 15, but the power source is not limited to the internal combustion engine, and may be a motor for example. In addition, a different type of power source may be used like the internal combustion engine and the motor.

REFERENCE SIGNS LIST 1 control unit
2 driver
3 motor
4 position sensor (rotation sensor)
5 current sensor
6 storage device
10 rotation shaft
11 actuator
11a input actuator
11b output actuator
12 slide shaft
13 transmission
14 output shaft
15 input shaft
101 belt
102 output pulley
103 input pulley
201 roller
202 output disk
203 input disk
210 input radius
211 output radius
301 plunger block
302 hydraulic motor
303 hydraulic pump 501 condition determining device
502 position moving device
503 observation device
504 analysis device

The invention claimed is:

1. A transmission control system, comprising:
a motor;
an actuator that is driven by torque of the motor;
a transmission that changes a transmission ratio according to a changed position of the actuator;
a current sensor that detects a load current indicating a current to be supplied to the motor;
a position sensor that detects a rotational position of the motor;
a storage device that stores the transmission ratio in association with a plurality of characteristic curves indicating a correspondence relation between the rotational position and the load current;
a drive unit that drives the motor while a vehicle is stopped; and
a control device that includes a first estimation unit to estimate an initial transmission ratio indicating the transmission ratio when an ignition switch is turned on from the rotational position detected by the position sensor, the load current detected by the current sensor, and the characteristic curve in a period when the drive unit operates.

2. The transmission control system according to claim 1, wherein, in a case where the rotational position detected by the position sensor and the load current detected by the current sensor follow the characteristic curve or a curve offset from the characteristic curve in a period when the drive unit operates, the first estimation unit estimates the transmission ratio corresponding to the characteristic curve as the initial transmission ratio.

3. The transmission control system according to claim 1, wherein the control device includes a second estimation unit that estimates an initial rotational position, the initial rotational position indicating the rotational position of the motor when the ignition switch is turned on, on the basis of the rotational position in a range where the load current is not changed, in a case where the load current detected by the current sensor is not changed even when the rotational position detected by the position sensor is changed in a period when the drive unit operates.

4. The transmission control system according to claim 3, wherein the second estimation unit estimates, as the initial rotational position, the rotational position detected by the position sensor and the rotational position at an inflection point of a curve drawn by a locus of the load current detected by the current sensor in a period when the drive unit operates.

5. The transmission control system according to claim 3, wherein the second estimation unit corrects the initial rotational position according to a mechanism of the actuator or a material of a component of the actuator.

6. The transmission control system according to claim 3, wherein the drive unit drives the motor on the basis of the initial rotational position that is estimated by the second estimation unit.

7. The transmission control system according to claim 1, wherein the actuator applies a load corresponding to the rotational position of the motor toward the motor.

8. The transmission control system according to claim 1, wherein the drive unit operates in a predetermined period after the ignition switch is turned on.

9. The transmission control system according to claim 1, wherein the drive unit operates at timing when the ignition switch is turned on.

10. A control device that controls a vehicle,
wherein the vehicle includes
a motor,
an actuator that is driven by torque of the motor,
a transmission that changes a transmission ratio according to a changed position of the actuator,
a current sensor that detects a load current indicating a current to be supplied to the motor, and
a position sensor that detects a rotational position of the motor, and
wherein the control device estimates the transmission ratio when an ignition switch is turned on, on the basis of the rotational position detected by the position sensor and the load current detected by the current sensor when the motor is driven while the vehicle is stopped.

* * * * *